United States Patent [19]

Luigi

[11] Patent Number: 4,634,038
[45] Date of Patent: Jan. 6, 1987

[54] APPARATUS FOR THE MANUFACTURE OF RING MEMBERS

[76] Inventor: Caprioglio Luigi, Corso Francia 224, I-10146 Torino, Italy

[21] Appl. No.: 741,821

[22] Filed: Jun. 6, 1985

[30] Foreign Application Priority Data

Jun. 15, 1984 [IT] Italy .............................. 67612 A/84
Jun. 15, 1984 [IT] Italy .............................. 67613 A/84

[51] Int. Cl.⁴ ........................ B23K 37/04; B21H 1/06; B21K 1/38
[52] U.S. Cl. .................................... 228/17.5; 228/18; 228/19; 228/47; 228/149; 29/159.1; 29/463
[58] Field of Search ..................... 228/17.5, 18, 19, 47, 228/152, 149; 29/159.1, 159 R, 463

[56] References Cited

U.S. PATENT DOCUMENTS 3,091,202  5/1963  Mackey ............................... 228/49.2
3,473,721 10/1969  Heymann et al. ..................... 228/18
3,934,324  1/1976  Hess et al. .......................... 228/17.5
4,082,935  4/1978  Lampietti et al. ................. 29/159.1
4,508,255  4/1985  Lorenz et al. ...................... 228/17.5

FOREIGN PATENT DOCUMENTS 2426379  1/1975  Fed. Rep. of Germany ..... 228/17.5

Primary Examiner—Nicholas P. Godici
Assistant Examiner—Samuel M. Heinrich
Attorney, Agent, or Firm—Young & Thompson

[57] ABSTRACT

An equipment for the manufacture of ring members for vehicle wheels starting from metal plate strip cut lengths, which mainly comprises a cylinder bending station formed by a calender, a welding station formed by two discontinuous type welding machines with rollers (which carry out a so-called "écrasé" welding in which the overall lap joint thickness is reduced plastically to about the thickness of one of the lapped end edges), each having a grasping device, intended for grasping the workpiece, movable between an extracted position, in which it extends into the bending station to grasp the workpiece lying therein, and a retracted position, and a rolling station which comprises a pair of rollers, one of which is driven; the welding station is arranged to move, during the welding step, between a first position, in which the first welding machine faces the bending station, and a second position, in which it faces the subsequent rolling station, and the two welding machines alternate in the two mentioned positions; the rolling station is intended to work on the ring members delivered by the welding station while these ring members are still hot in consequence of the welding they have been subjected to.

16 Claims, 17 Drawing Figures

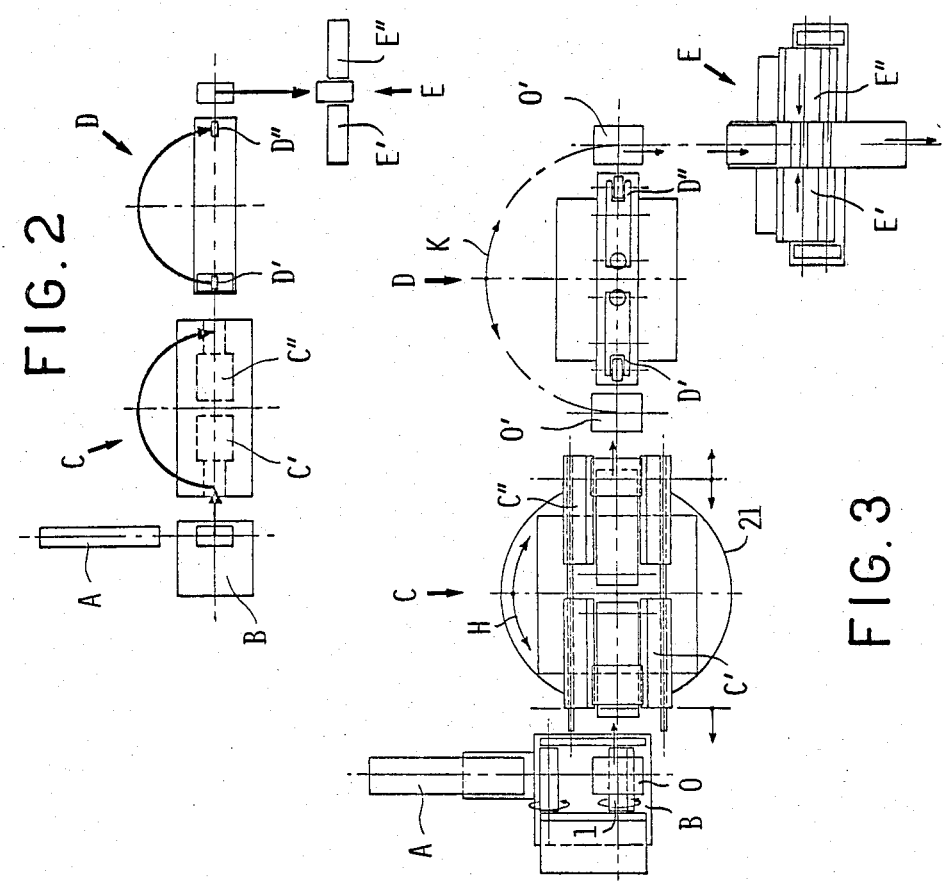
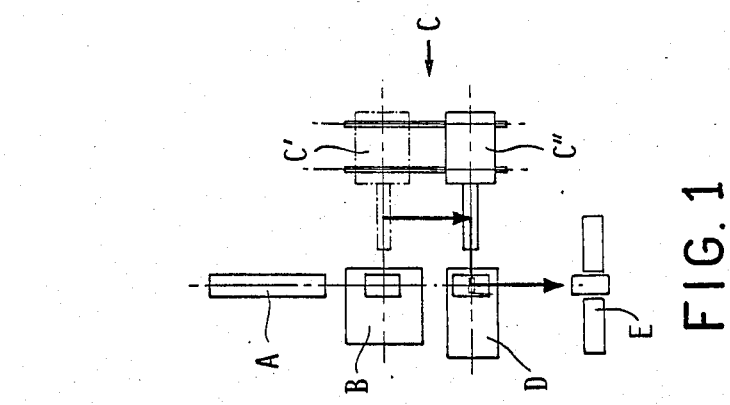

APPARATUS FOR THE MANUFACTURE OF RING MEMBERS

BACKGROUND OF THE INVENTION

This invention relates to apparatus for manufacturing, starting from metal plate strip cut lengths, ring members intended to be successively worked to form rims for vehicle wheels.

Usually, the welded plate wheels for vehicles are manufactured by connecting, for each wheel, a cup made of stamped plate to a rim obtained by working a ring member which, on its turn, is formed by welding to one another the end edge portions of a bent cut length of metal plate strip. For the production of these ring members equipments are used which comprise a series of stations, among which are mainly a cylinder bending machine (so-called calender), a flash welding machine and a machine for the mechanical removal of the excess material pushed out from the welding zone. These different machines are mounted, for forming a machining line, by simply connecting them sequentially to one another with the interposition of conveyer means for conveying the workpieces, and they work in a synchronized but substantially individual manner, the workpieces being simply taken from a machine which has completed its working cycle, and conveyed to the following machine for carrying out the subsequent working step. Such equipment has considerable overall dimensions, considerable transfer idle times, synchronization difficulties and, in connection with the different working times of the different stations, the incapability of fully exploiting the working capacity of certain stations, thus giving rise to a restriction of the productivity and to high manufacturing costs. Particularly, the welding station has much higher working times than those of the other stations, and therefore it gives rise to a serious restriction of the operative flow. Moreover, such equipment is not suitable for conveniently carrying out the welding by processes other than the flash welding process.

SUMMARY OF THE INVENTION

It is an object of this invention to provide apparatus for the purpose stated hereinabove, which, on the contrary, will be formed by the organized combination of a series of stations strictly coordinated with one another in such a manner that each workpiece will pass directly from each station to the next one without transfer idle times and that the productivity of each machine of the equipment may be conveniently exploited in spite of the differences in the working times of the various machines; and furthermore, this equipment is such as to allow carrying out the welding by a process more convenient than the flash welding process.

This object is attained, according to the invention, by apparatus for manufacturing, starting from metal plate strip cut lengths, ring members intended to be successively worked to form rims for vehicle wheels, characterized in that it mainly comprises a cylinder bending machine, a welding machine with flushing rollers (which provides a so-called "écrasé" welding, in which the overall lap joint thickness is reduced plastically to about the thickness of one of the lapped end edges), a hot rolling station and a removal station for removing the excess material pushed out at the beginning and at the end of the welding zone; the bending station being substantially constituted by a calender; the welding station being constituted of at least one discontinuous type welding machine with flushing rollers, by a corresponding grasping means, intended for grasping the workpiece, movable between an extended position and a retracted position, and by a movable support displaceable between a first and a second position; the rolling station being constituted by at least a pair of rollers, by means for driving at least one of said rollers and by means for supporting and guiding the workpieces; and the removal station being constituted by mechanical means for material removing, arranged to work only on the end portions of the workpieces; the mutual arrangement of said stations being such that when the movable support of the welding station is in its first position said welding machine faces the bending station, and said grasping means, in its extended position, extends into the bending station in such a position as to be able to grasp the workpiece lying therein, whilst, when said movable support of the welding station is in its second position, said welding machine faces the rolling station, and said grasping means, in its extended position, is positioned in such a position as to allow a workpiece to be transferred to the support and guide means of the rolling station; said welding machine being arranged to carry out the welding operation during the travel of said grasping means from the retracted position towards the extended position, and said movable support of the welding station being arranged so as to pass from the first to the second position during the welding step.

Thanks to these features, a metal plate strip cut length fed to the bending station is cylindrically bent and then, in the thus-attained condition, is grasped by the grasping means of the welding station and, while maintaining unmodified the geometrical configuration of its end edge portions to be welded, it is introduced into the welding machine with flushing rollers and then pushed again outwards while the welding is being carried out and while the welding machine, which formerly was facing the bending station, moves until it comes to face the rolling station, and immediately delivers to this latter the just-welded workpiece, which then may be hot-rolled by reusing the heat it has received during the welding process. Finally, the station for removing the pushed out material may work only on the end portions of the workpiece, by virtue of the fact that the welding process with flushing rollers does not produce any crest of pushed out material along the entire welded joint, but only a moderate step, which is then levelled by the rolling station, and peaks of material which project only at the ends of the welded joint and are then removed by the station for removing the excess material.

The manner of operation makes possible by the described structure of the equipment allows obtaining large savings in working times, particularly in the execution of the welding, and hence a satisfactory and orderly exploitation of the working capacity of the machines of the equipment, a considerable improvement in the characteristics of the manufactured pieces, due to the welding being carried out by a process which ensures attainment of a more favourable metallographic structure, and appreciable economical savings resulting from a reduction of the waste of material, from the possibility of using less valuable metal plate qualities and from savings in energy. In addition, the whole equipment assumes a compact configuration which considerably reduces its overall dimensions.

According to an important further development of the inventive idea set forth hereinabove, the welding station comprises two welding machines with the respective grasping means, which machines are arranged in such a way that, when the support of the station is in its first position, the first welding machine and the first grasping means are facing the bending station and the second welding machine and the second grasping means are facing the rolling station, while, when the support of the station is in its second position, the first welding machine and the first grasping means are facing the rolling station, and the second welding machine and the second grasping means are facing the bending station. Thanks to this feature, each welding machine may carry out a welding operation during the time in which the other welding machine returns from the position in which it faces the rolling station to the position in which it faces the bending station, thus allowing to further reduce the total time of the welding step and to increase the productivity.

A similar arrangement may be applied for the rolling station. The invention further relates to arrangements and configurations in respect of the different stations and machines forming the equipment, which allow exploiting in the best way the advantageous characteristics of the invention.

BRIEF DESCRIPTION OF THE DRAWINGS

The mentioned and other characteristics, and the advantages obtained by applying the invention, will become more clearly apparent from the following description of some embodiments, described by way of non limiting examples and diagrammatically shown in the annexed drawings, in which:

FIG. 1 shows on a small scale the diagram of a particularly simple embodiment of the equipment incorporating the invention, suitable for moderate productions;

FIG. 2 similarly shows the diagram of a more advanced embodiment, suitable for larger productions;

FIG. 3 shows on a larger scale and in a more detailed manner the diagram of FIG. 2;

DETAILED DESCRIPTION OF A PREFERRED EMBODIMENT

Referring now to FIG. 1, an equipment according to the invention comprises, in its more simple form, a cylinder bending station B, fed by suitable metal plate strip cut lengths feeding means A (which means are per se known and do not form a part of this invention), a welding station C movable as a whole (by translation, in this example) between an inlet position C' facing the bending station B, and an outlet position C" facing a rolling station D, and an excess material removing station E which follows the rolling station D. In this embodiment, suitable for moderate productions, the welding station C comprises a single welding machine, which carries out the welding during the displacement from the position C' to the position C" and remains inactive during the return from the position C" to the position C'.

On the contrary, in the more elaborate embodiment according to FIG. 2, the welding station includes a pair of welding machines movable (by a half rotation, in this example) between an inlet position C' facing the bending station B and an outlet position C" facing the rolling station D. This latter, in its turn, comprises a pair of rolling machines movable (by a half rotation, in this example) between an inlet position D' facing the welding station C and an outlet position D" which is followed by the material removing station E. The material removing station E also comprises two removal devices E' and E" intended to simultaneously work on both sides of the welded and rolled ring member. The diagram of FIG. 2 is reproduced on a larger scale and in a more detailed manner in FIG. 3, and since this is the preferred embodiment, the description which follows will be based on this example.

Figure 4:
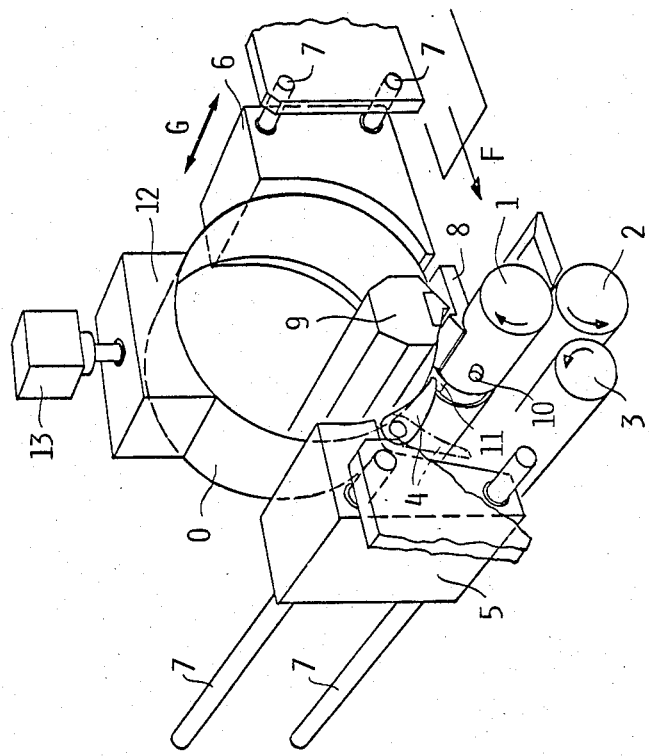
FIG. 4 is a perspective view showing the essential parts of the bending station.

Referring now to FIG. 4, the cylinder bending station comprises a series of rollers 1, 2, 3, maintained in rotation by driving means (not shown) and arranged, in a known manner, in such a way as to bend a metal plate cut length introduced between them in the direction of the arrow F, whereby it assumes a cylindrical shape 0 corresponding to that of the ring member to be manufactured. The station further comprises a guide assembly formed by two blocks 5 and 6 movable along stationary guides 7 in the direction of the double arrow G. Pivoted on the block 5 there is a guiding tab 4, which during the bending operation is moved to the position shown by broken lines. Installed above roller 1 there is a plate 8 provided with an abutment step, and installed above this plate there is a bar 9 also provided with an abutment step. The two abutment steps of the plate 8 and of the bar 9 are facing one another and they are spaced vertically by a distance equal to the thickness of the metal plate used, and horizontally by a distance equal to the overlapping width that one wants to have at welding. These distances may if desired be adjustable for a perfect setting up.

As the bent cut length of metal plate leaves the rollers 1 and 2, being guided by the blocks 5, 6, it abuts with its leading end edge portion against the step of the plate 8, while its trailing end edge portion abuts against the step of the bar 9, aided in this by the oscillation of the tab 4 which is moved to the position indicated with full lines, as well as by the thrust of retractable fingers 10 provided on roller 1 and, if necessary, by the thrust of scrapers 11 provided on plate 8. The correct positioning and maintenance of this position (to which corresponds the exact configuration of the ring member to be manufactured) is ensured by the pressure which is exerted, after the cylindrically bent plate 0 has assumed the described position, by an upper retainer block 12 pushed by an hydraulic cylinder 13 or another driving means. At this time the ring member is in a condition suitable for being forwarded to the welding step.

Figure 5:
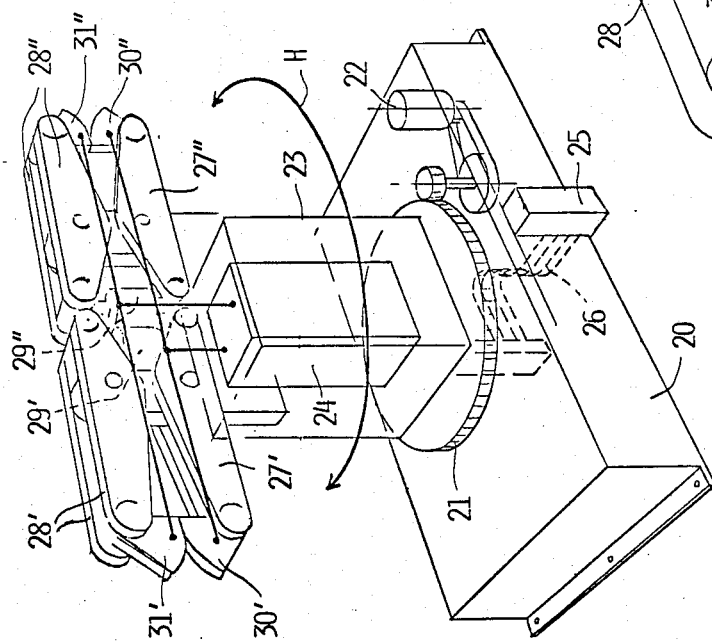
FIG. 5 is a perspective view showing the essential parts of the pair of welding machines and those of the movable support of the welding station.

Referring to FIG. 5, the welding station comprises a base 20 with mounted thereon a rotatable plate 21 which supports the apparatuses forming the station and may be rotated by a driving motor 22. Mounted on the rotatable plate 21 there is a plinth 23 containing a welding transformer 24 which is fed, starting from stationary conductors 25, through flexible conductors 26; it is not necessary to provide sliding contacts or the like, because the rotatable plate 21 performs only half turns, alternately in opposite directions, as indicated by the curved double arrow H. Mounted in symmetrically opposite positions on plinth 23 there are two special roller pinch welding machines, whose components are distinguished by single indexes (') and double indexes (") respectively, and only one of which will now be described by using reference numerals without indexes.

Figure 7:
FIG. 7 is a perspective view showing, in particular, one of the electrodes of the welding machines according to FIG. 5.

The welding machine comprises a pair of lower rocker arms 27 and a pair of upper rocker arms 28, pivoted on supports mounted on plinth 23 and whose outer ends may be brought together by a hydraulic cylinder 29 connected to their inner ends. The outer ends of the arms of each pair support a pivoted sector roller 30 and 31, respectively. As shown in FIG. 7, each sector roller, for example 31, is pivoted at 36, it supports a replaceable operative segment 32 fixed by retainer means 33, and is connected to a fixed conductor 34 by means of a flexible conductor 35. The peripheral length of the operative segment 32 is at least equal to the length of the weld to be made on the ring member. The welding operation is carried out by forcing the operative segments of the rollers 30 and 31 to roll under a strong pressure applied by the hydraulic cylinder 29, and with the application, by the transformer 24, of an appropriate low voltage, to which corresponds a high current capable of carrying out the welding. The rolling movement of the rollers 30 and 31 takes place on both opposite sides of the superimposed end edge portions of the bent metal plate strip cut length 0, intended to form the ring member and suitably introduced between the sector rollers 30 and 31. The result of this working step is a roll resistance weld, of the so-called "écrasé" type, in which the overall lap joint thickness is reduced plastically to about the thickness of one of the lapped end edges.

Figure 6:
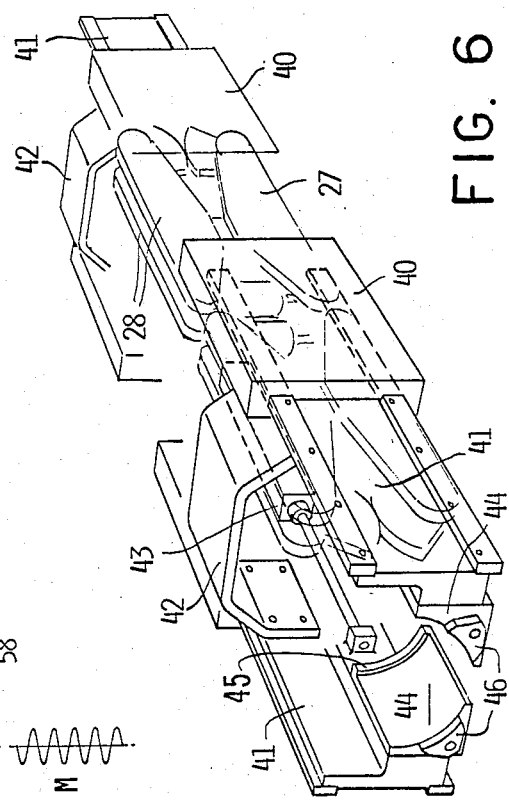
FIG. 6 is a perspective view showing the essential parts of the grasping means associated with each of the welding machines according to FIG. 5.

Associated with each welding machine of the welding station there is a grasping means, not shown in FIG. 5 and represented separately in FIG. 6. The grasping means comprises two movable elements 41 connected by a bridge member 42 and displaceable within a support member 40, fixed to the plinth 23, under the action of driving means, such as hydraulic cylinders 43. The movable elements 41 extend parallel to and externally of the upper arms 28 of the welding machine, and they terminate at the outer end with vises having a fixed shoulder 45 and a movable jaw 46 provided with driving means (not shown) disposed within the vises 44. The vises 44 are curved in a manner corresponding to the cylindrically bent cut length 0 (FIG. 4), and hence to the ring member to be manufactured, and their dimensions are such as to allow rigidly grasping the bent cut length, by clamping the same in its axial direction when the jaws are activated.

These grasping means have the function of taking the cut length 0 from the bending station, introducing the same into the welding machine, then returning it towards the outside while the welding is performed, and finally transferring the just-welded cut length to the rolling station. The mentioned operations take place as illustrated in the series of FIGS. from 8 to 15, which represent some successive steps thereof.

Figure 10:
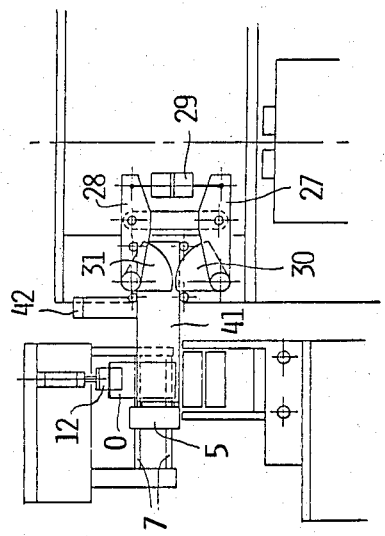
FIGS. 8 to 15 diagrammatically illustrate the successive steps of the coordinated operation of the welding machines and the grasping means of the welding station.
Figure 11:
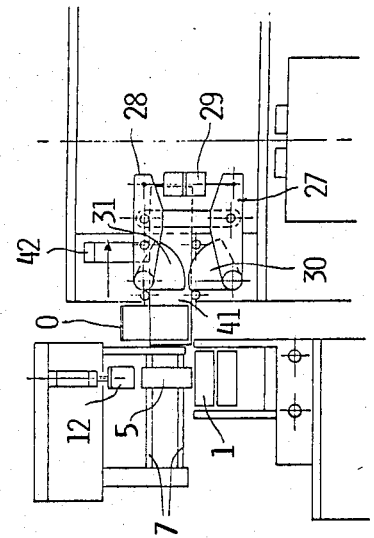
Figure 8:
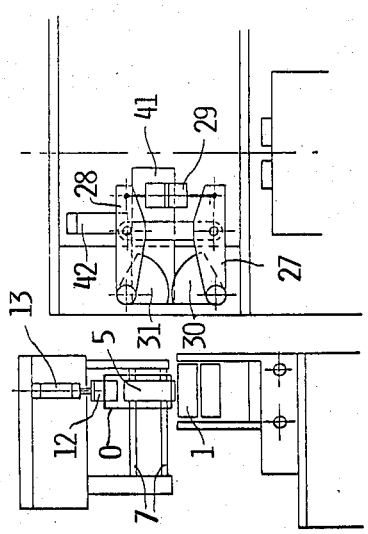
Figure 9:
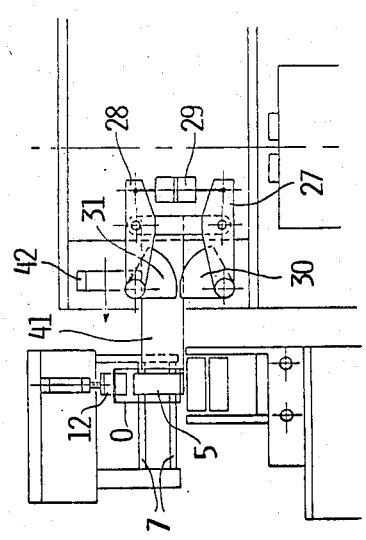
Figure 12:
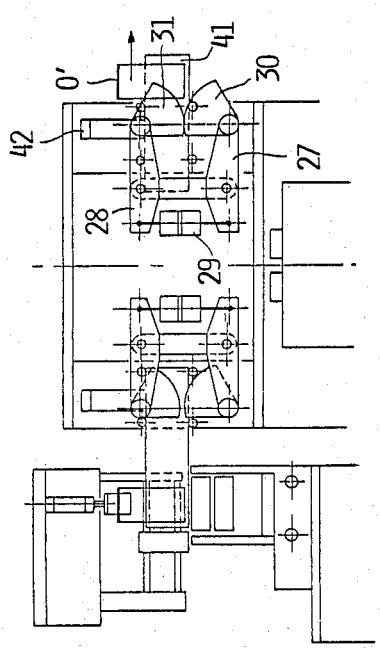
Figure 13:
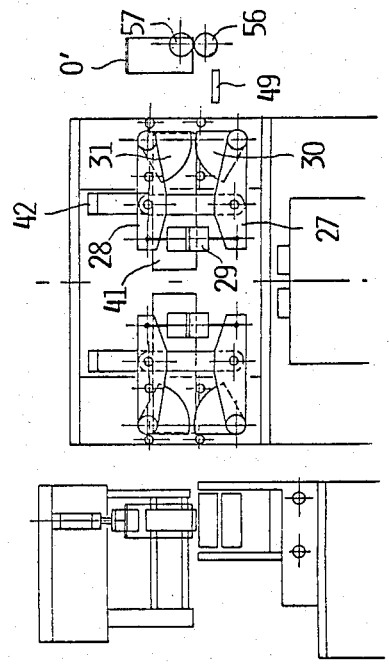
Figure 14:
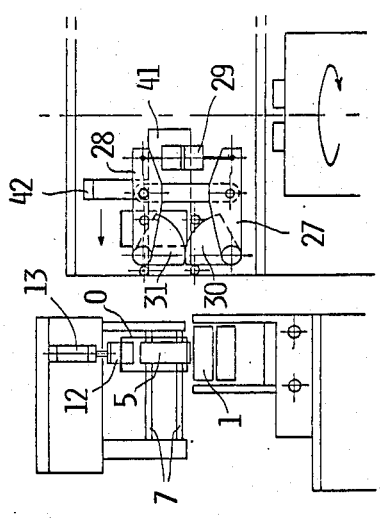

FIG. 8 diagrammatically shows the welding machine facing the bending station, prior to the grasping step. The movable elements 41 are completely retracted towards the inside of the welding station; the cut length 0 has just been completely bent and is clamped by the upper block 12. At the beginning of grasping, the movable elements 41 are displaced towards the outside until they contact the blocks 5, (6) of the bending station (FIG. 9). Upon being further pushed outwards, the movable elements 41 drive back the blocks 5, (6), which are slidable on the guides 7, by bringing them beyond the bent cut length 0 (FIG. 10); the bent cut length 0 is prevented from moving back by finger-shaped rear stops, not shown. During this step the movable elements 41 pass to both sides of the plate 8 and the bar 9, with the vises 44 skimming the lower surface of the bent cut length 0. At the end of this travel, the shoulders 45 abut against the flanks of the bent cut length 0. At this point, the jaws 46 are activated and clamp the bent cut length 0 in the vises 44 against the shoulders 45. From this moment on, the grasping means are able to firmly maintain the bent cut length in the configuration it has assumed, irrespective of the action of the abutment steps of the plate 8 and the bar 9 and of the thrust of the upper block 12. This latter is then raised by means of the hydraulic cylinder 13, thus disengaging the bent cut length 0 from the bending station. The movable elements 41 are then withdrawn into the welding station, dragging therewith the bent cut length 0, which thus is withdrawn from the plate 8 and the bar 9 while maintaining unmodified the geometrical configuration of its end edge portions, whilst the blocks 5, (6) recover their normal position in order to allow bending a new cut length (FIG. 11). The movable elements 41 are completely withdrawn into the welding station (FIG. 12) while this latter begins to be rotated about its axis by the driving means 22. The movable elements 41 are then pushed again outwards, while the cylinder 29 pushes the sector rollers 30, 31 with strong pressure against the superimposed end edge portions of the bent cut length 0, and the transformer 24 applies to said sector rollers a welding current. The sector rollers, by rolling in this way against the cut length, perform on this latter the "ecrase" welding, described above. This working step is shown in FIG. 13 during its performance, while the welding station is completing a rotation on itself of 180° with respect to the position shown in FIG. 12, and therefore the welding machine, whose operation is observed, is now turned towards the side opposite to the bending station. In FIG. 14, the welding step is shown as being already completed, and the movable elements 41 are displacing the welded ring member 0' towards the rolling station, while the other welding machine of the welding station, now facing the bending station, has its grasping mena in the process of grasping a new bent cut length 0. Finally, in FIG. 15, the movable elements 41 of the two welding machines have already been withdrawn, the just-welded ring member 0' has been already taken by the rollers 56, 57 of the rolling station, and the new bent cut length 0 to be welded is introduced into the second welding machine of the station, which is at the point of beginning, in its turn, the welding step. This latter will be carried out while the first welding machine, because of a half rotation of the welding station (in a direction opposite the former one), will be turned again towards the bending station, thus completing the operation cycle described hereinabove.

The use, in the welding machine, of welding rollers 30, 31 each reduced to a sector and which, instead of rotating in a continuous manner, carry out an oscillation through a limited angle, affords various advantages. Firstly, the operative radius of the sector rollers may be chosen much greater then could be the radius of a complete roller, taking into consideration the dimensional limitations imposed by the need of penetrating into the bent cut length to be welded; this results in a much longer life of the operative surface of the rollers, as well as in a more regular execution of the welding. Secondly, the electrical connection of the sector rollers may be made by means of the flexible conductors 35, thus avoiding the use of sliding or mercury contacts, which are expensive and give rise to high maintenance costs. Finally, the operative roller parts which are subject to wear are limited to sectors, and these latter may be replaced, when needed, by an operation much simpler and quicker than the substitution of entire rollers, thus reducing the machine dead times.

Figure 16:
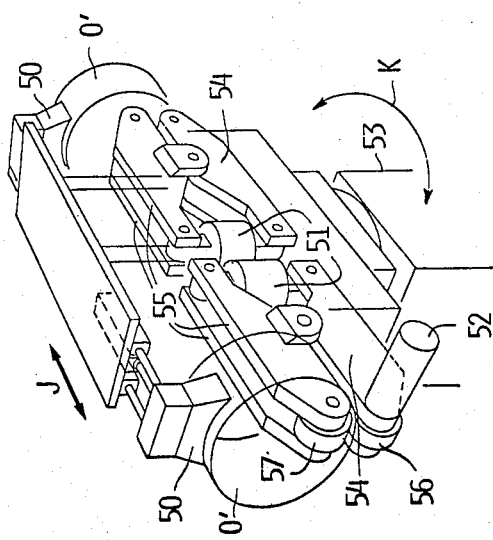
FIG. 16 is a perspective view showing the essential parts of the rolling station.
Figure 15:
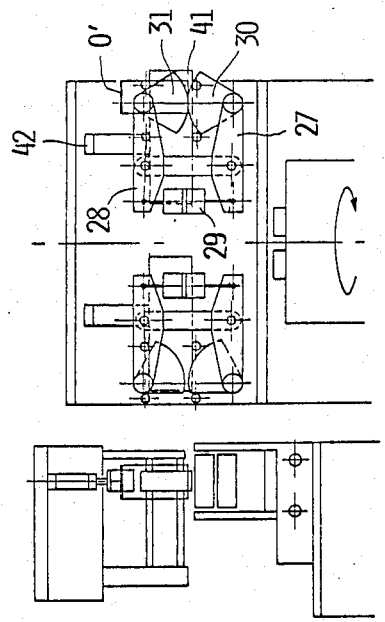

Referring to FIG. 16, the rolling station is double, similarly to the welding station, and like this latter (FIG. 5) it comprises a base on which is mounted a rotatable support plate which carries the apparatuses forming the station and may be made to rotate by a driving motor. On said plate is arranged a support 53 which carries two symmetrically opposite rolling machines. Each rolling machine comprises a lower arm 54 and an upper arm 55 which form a scissors system; at the outer ends of the arms 54 and 55 are mounted rolling rollers, 56 and 57 respectively, one of which is connected to a motor reducer unit 52. The rollers 56, 57 may be pushed with force towards one another by an hydraulic cylinder 51 acting on the opposite ends of the arms 54, 55. Support 53 also mounts, at its upper end, two support and guide means 50, for example of a type with electromagnetic retention, which are slidable in the direction of the double arrow J. Under the action of the motor reducer unit 52, and being loaded by the thrust of the cylinder 51, the rollers 56 and 57 perform the rolling of the just-welded ring member 0', which they receive from the welding station as shown in FIG. 15. This rolling operation is carried out in a heated condition thanks to the immediacy with which the rolling step follows the welding step and thanks to the heat applied to the concerned zone during the preceding welding step, and this ensures the obtention of favourable metallographic characteristics of the welding zone after the rolling operation, which is intended to level off the moderate projection left by the "écrasé" welding. At the same time, the energy consumption which otherwise would be connected with the heating of the ring member in view of its hot rolling is avoided. Should it appear to be useful, a heating element of moderate power may be installed at 49 (FIG. 15) along the short trajectory covered by the welded ring member 0' to passing from the welding station to the rolling station, in order to avoid an excessive dispersion of heat by radiation during this passage.

The rotation of the rolling station, consisting in half turns alternately in opposite directions, as indicated by the curved double arrow K, takes place during the rolling of the welded ring member 0' and allows forwarding this latter, after rolling, to the successive removal station, whilst the second rolling machine of the rolling station positions itself in front of the welding station in order to receive another welded ring member to be rolled.

The operation of the removal station which removes the excess material pushed out from the welding zone is extremely simplified in the equipment according to the invention, as compared with the known equipments wherein the welding is performed by flashing, because the flushing roller welding process does not generate crests of material pushed out along the entire weld line, but only moderate peaks projecting at the ends of the weld line, on the sides of the welded ring member. Therefore, the removal station has to work only on the sides of the ring member, for removing a minimum mass of material. This allows carrying out this working step in a rational manner by means of a tool acting as a shaper.

As shown in FIG. 3, the removal station comprises two opposite removing devices intended to work simultaneously on both sides of the rolled ring member; the two devices are symmetrical to one another, and only one of them will now be described with reference to FIG. 17. Each removing device comprises a frame 60 slidable, under the action of an hydraulic cylinder 59, on guides 58. A motor 61 mounted on the frame 60 makes rotate synchronously two wheels 62, 63 provided with eccentric pivots 64, 65 arranged in quadrature with one another. To the eccentric pivot 64 is connected an arm 66 which supports at its end a shaper tool 68; said arm 66 is also joined to a connecting rod 67 linked to the eccentric pivot 65.

Figure 17:
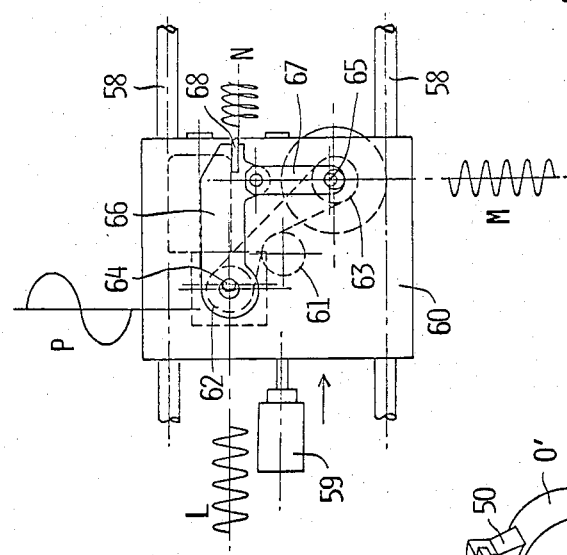
FIG. 17 shows the essential parts of a device of the excess material removing station.

Owing to the eccentricity of the pivot 65, the tool 68 receives a reciprocating movement in a direction perpendicular to the guides 58, which is represented in FIG. 17 by the diagram L. On the other hand, because of the eccentricity of the pivot 64, the tool 68 also receives a reciprocating movement in a direction parallel to the guides 58, which is represented by the diagram M. The combination of these two movements generates a periodical complex movement of the tool 68, represented by the diagram N in the approximate form of an elongated cycloid. Thanks to the regression periods of this movement it is possible to approach the tool to the ring member to be worked, by the action of the cylinder 59 and, for example, according to a diagram like P, without the tool scraping its flanks on the workpiece. Thus, it becomes possible to remove the peaks of material shown by the rolled ring member at the points of beginning and termination of the welding, by a tooling which can be carried out quickly, automatically and without soiling the ambient.

The whole of the characteristics described for the equipment according to the invention originates operative conditions considered to be optimal, however it is to be understood that in certain cases some of these characteristics may be omitted, modified or replaced.

I claim:

1. Apparatus for manufacturing ring members, starting from metal plate strip cut lengths, comprising: a cylinder bending machine, a welding machine of the type with flushing rollers, a hot rolling station and a removal station for removing the excess material pushed out at the beginning and the end of the welding zone; said bending station including a calender; said welding station including at least one welding machine of discontinuous type with flushing rollers, a corresponding grasping means for grasping the workpiece, said grasping means being movable between an extended position and a retracted position, and a movable support, said movable support being displaceable between a first and a second position; said rolling station including at least a pair of rollers, means for driving at least one of said rollers and means for supporting and guiding the workpiece; and said removal station including mechanical means for material removing, said material removing means being arranged to work only on end portions of the workpiece; the mutual arrangement of said stations being such that when said movable support of the welding station is in its first position said welding machine faces the bending station, and said grasping means, in its extended position, extends into the bending station in such a position as to grasp the workpiece lying therein, whilst, when said movable support of the welding station is in its second position, said welding machine faces the rolling station, and said grasping means, in its extended position, is positioned in such a position as to transfer a workpiece to said support and guide means of the rolling station; said welding machine being arranged to carry out the welding operation during the travel of said grasping means from the retracted position towards the extended position, and said movable support of the welding station being arranged so as to pass from the first to the second position during the welding step.

2. Apparatus as set forth in claim 1, wherein said welding station comprises first and second welding machines and respective first and second grasping means, said welding machines being arranged in such a way that, when said support of the welding station is in its first position, said first welding machine and said first grasping means are facing the bending station and said second welding machine and said second grasping means are facing the rolling station, while, when said support of the welding station is in its second position, said first welding machine and said first grasping means are facing the rolling station, and said second welding machine and said second grasping means are facing the bending station.

3. Apparatus as set forth in claim 2, wherein said rolling station comprises a movable support, said movable support being displaceable between a first and a second position, and a pair of rolling machines carried by said movable support and arranged in such a manner that, in the first position of said support of the rolling station, said first rolling machine faces the welding station and said second rolling machine is turned towards the removal station, whilst, in the second position of said support of the rolling station, said first rolling machine faces the removal station and said second rolling machine is turned towards the welding station.

4. Apparatus as set forth in claim 1, wherein said bending station comprises bending rollers, a plate having an abutment step mounted above said bending rollers, a bar mounted above said plate, said bar having an abutment step facing at a pre-established distance said abutment step of the plate, two fixed guides, guide blocks for guiding the cut length in course of bending, said guide blocks being movable on said guides until a position in which they are disengaged from said cut length, an upper retainer block and driving means for actuating said retainer block in order to lock in an exact and repeatable manner a bent cut length having its ends abutting against said abutment steps.

5. Apparatus as set forth in claim 1, wherein said welding machine comprises lower and upper rocker arms, welding rollers supported at the outer ends of said rocker arms, and a thrust hydraulic cylinder connected to the inner ends of said rocker arms, and wherein said grasping means associated with the welding machine include movable grasping elements displaceable parallel to said arms of the welding machine and arranged outside said upper arms of the welding machine.

6. Apparatus as set forth in claim 5, wherein said movable grasping elements have vises mounted onto the outer ends thereof, said vises being so shaped as to conform to a sector of the outer surface of a bent cut length and having a fixed inner shoulder and outer jaws operable to grasp a bent cut length on its opposite edges while maintaining unmodified the geometrical configuration of the end edge portions to be welded, as established in the preceding working step; and wherein said movable grasping elements are arranged to retract said guide blocks of the bending station until out of engagement with said bent cut length during the grasping of this latter.

7. Apparatus as set forth in claim 5, wherein said welding rollers are in the form of sectors, said sectors being arranged to rotate, during the welding operation, through a limited angle, and said welding rollers have flexible conductors connected to an electric feeding circuit.

8. Apparatus as set forth in claim 7, wherein said welding rollers in the form of sectors comprise operative segments replaceably retained.

9. Apparatus as set forth in claim 1, wherein said welding station comprises a base, a motor mounted on said base, a support plate mounted on said base for alternating rotary movement for a limited angle under action of said motor, a support plinth mounted on said support plate, a feeding transformer contained in said support plinth, flexible conductors connecting said feeding transformer to an electric feeding circuit, and two welding machines as well as two associated grasping means mounted on said plinth.

10. Apparatus as set forth in claim 1, wherein said rolling station comprises at least a rolling machine including a lower arm, a first roller supported by said lower arm, a motor driving said first roller, an upper arm, a second roller idle and supported by said upper arm, said lower and upper arms forming a scissors system, and an hydraulic cylinder mounted between said two arms to exert on said rollers a rolling pressure.

11. Apparatus as set forth in claim 10, wherein said means for supporting and guiding the workpiece comprise a guiding member parallel to said lower and upper arms and at least an electromagnetic grasping device supported by said guide member.

12. Apparatus as set forth in claim 1, wherein said rolling station comprises a movable support plinth and two rolling machines as well as two associated support and guide means mounted on said support plinth, said support plinth being rotatable in alternately opposite directions.

13. Apparatus as set forth in claim 1, wherein said removal station for removing the excess material comprises at least one mechanical tool and means for operating said mechanical tool in a reciprocating manner in order that said tool acts as a shaper on the side edges of a welded and rolled ring member.

14. Apparatus as set forth in claim 13, wherein said removal station for removing the excess material comprises a pair of mechanical tool devices, symmetrically arranged in order to simultaneously work on both sides of a welded and rolled ring member.

15. Apparatus as set forth in claim 13, wherein each mechanical tool device comprises fixed guides, a frame movable on said guides for approaching to the ring member to be worked, means for actuating the movement of said frame, a mechanical tool and means for imparting to said mechanical tool a reciprocating work movement having regression periods intended to prevent the tool from scraping on the workpiece.

16. Apparatus as set forth in claim 15, wherein said means for imparting a reciprocating movement to the mechanical tool comprise a motor, two wheels having eccentric pivots arranged in quadrature with one another, said wheels being driven by said motor, an arm supporting said tool and connected to the one of said eccentric pivots, and a connecting rod linking said arm to the other of said eccentric pivots.

* * * * *